United States Patent
Kataoka et al.

(10) Patent No.: US 7,663,274 B2
(45) Date of Patent: Feb. 16, 2010

(54) MOTOR

(75) Inventors: Nakaba Kataoka, Kyoto (JP); Takayuki Migita, Kyoto (JP); Hiroaki Suzuki, Toyota (JP)

(73) Assignee: Nidec Corporation, Kyoto (JP)

( * ) Notice: Subject to any disclaimer, the term of this patent is extended or adjusted under 35 U.S.C. 154(b) by 485 days.

(21) Appl. No.: 11/162,733

(22) Filed: Sep. 21, 2005

(65) Prior Publication Data

US 2006/0063403 A1   Mar. 23, 2006

(30) Foreign Application Priority Data

Sep. 21, 2004   (JP) ............................. 2004-273018
Oct. 8, 2004   (JP) ............................. 2004-295758

(51) Int. Cl.
*H01R 12/00* (2006.01)
(52) U.S. Cl. ................................... 310/68 R; 439/76.2
(58) Field of Classification Search ............... 310/68 B; 439/76.2
See application file for complete search history.

(56) References Cited

U.S. PATENT DOCUMENTS

| | | | | |
|---|---|---|---|---|
| 4,131,989 A | * | 1/1979 | Periou ........................ 29/596 |
| 4,259,603 A | * | 3/1981 | Uchiyama et al. ......... 310/68 B |
| 4,677,329 A | * | 6/1987 | Secoura ....................... 310/71 |
| 4,847,527 A | * | 7/1989 | Dohogne .................... 310/218 |
| 5,010,263 A | * | 4/1991 | Murata ..................... 310/68 B |
| 5,184,038 A | * | 2/1993 | Matsui et al. ................. 310/42 |
| 5,650,701 A | * | 7/1997 | Shimizu et al. ............. 318/489 |
| 5,770,902 A | * | 6/1998 | Batten et al. .................. 310/71 |
| 5,927,429 A | * | 7/1999 | Sugino et al. .............. 180/444 |
| 5,971,094 A | * | 10/1999 | Joshita ....................... 180/444 |
| 6,000,491 A | * | 12/1999 | Shimizu et al. ............. 180/444 |
| 6,013,961 A | * | 1/2000 | Sakamaki et al. ......... 310/68 B |
| 6,107,716 A | * | 8/2000 | Penketh ........................ 310/89 |
| 6,225,716 B1 | * | 5/2001 | Sies et al. ................. 310/68 B |
| 6,268,669 B1 | * | 7/2001 | Wakao et al. ............. 310/67 R |
| 6,313,624 B1 | * | 11/2001 | Alhorn et al. .......... 324/207.17 |
| 6,351,050 B1 | * | 2/2002 | Coles ..................... 310/156.53 |
| 6,491,131 B1 | * | 12/2002 | Appleyard .................. 180/444 |
| 6,577,030 B2 | * | 6/2003 | Tominaga et al. .......... 310/68 B |
| 6,603,226 B1 | * | 8/2003 | Liang et al. ............... 310/68 B |
| 6,707,185 B2 | * | 3/2004 | Akutsu et al. ................. 310/71 |
| 6,739,034 B2 | * | 5/2004 | Suzuki et al. ................. 29/732 |
| 6,750,574 B2 | * | 6/2004 | Okazaki et al. ........... 310/68 B |

(Continued)

FOREIGN PATENT DOCUMENTS

JP    H02-087959 A    3/1990

(Continued)

*Primary Examiner*—Quyen Leung
*Assistant Examiner*—Naishadh N Desai
(74) *Attorney, Agent, or Firm*—Keating & Bennett, LLP

(57) ABSTRACT

A motor stator section (3*a*) is furnished with a busbar (51) attached to an armature (3), and with a circuit board (52) attached to the busbar (51). A parts accommodation recess (516) is formed in the busbar (51) surface that opposes the circuit board (52), and a holding recess (512), in which is anchored a sensor holder (54) that retains Hall sensors (53) mounted on the circuit board (52) is formed in the busbar (51) inner circumferential surface. Further, grooves are formed in the circuit board (52), the sensor holder (54), and the busbar (51), wherein fitting a jig (9) to these grooves enables high-precision assembly of these components.

13 Claims, 10 Drawing Sheets

U.S. PATENT DOCUMENTS

| | | | |
|---|---|---|---|
| 6,761,244 B2 * | 7/2004 | Sano et al. | 180/444 |
| D496,630 S * | 9/2004 | Burton | D13/122 |
| 6,807,724 B2 * | 10/2004 | Yasuda et al. | 29/732 |
| 6,848,534 B2 * | 2/2005 | Toyofuku et al. | 180/444 |
| D505,916 S * | 6/2005 | Hilton | D13/112 |
| 7,021,418 B2 * | 4/2006 | Tominaga et al. | 180/444 |
| 7,211,918 B2 * | 5/2007 | Migita et | 310/215 |
| 7,253,546 B2 * | 8/2007 | Fukuda et al. | 310/179 |
| 2002/0060105 A1 * | 5/2002 | Tominaga et al. | 180/443 |
| 2002/0108803 A1 * | 8/2002 | Toyofuku et al. | 180/443 |
| 2002/0175574 A1 * | 11/2002 | Okazaki et al. | 310/68 B |
| 2003/0071530 A1 * | 4/2003 | Takahashi | 310/156.48 |
| 2003/0098660 A1 * | 5/2003 | Erdman et al. | 318/254 |
| 2003/0150103 A1 * | 8/2003 | Yasuda et al. | 29/732 |
| 2005/0116561 A1 * | 6/2005 | Matsubara et al. | 310/83 |
| 2005/0269895 A1 * | 12/2005 | Innami et al. | 310/218 |

FOREIGN PATENT DOCUMENTS

| | | |
|---|---|---|
| JP | H02-262864 A | 10/1990 |
| JP | H06-036556 Y2 | 9/1994 |
| JP | H07-087696 A | 3/1995 |
| JP | H07-040780 B2 | 5/1995 |
| JP | 2519880 Y2 | 12/1996 |
| JP | H11-332160 A | 11/1999 |

* cited by examiner

MOTOR

BACKGROUND OF THE INVENTION

1. Technical Field

The present invention relates to electrically powered motors that are installed in vehicles.

2. Description of the Related Art

As a device for assisting automotive vehicle driving operations, hydraulic power steering, with which the operation of the steering wheel is assisted by means of hydraulic pressure generated by a pump run by engine output power, has traditionally been employed. In recent years, meanwhile, electric power assisted steering (abbreviated "EPAS" hereinafter), with which steering wheel operation is assisted by a motor rotationally powered by a vehicle on-board battery, has come into use. This latter power steering system, whereby engine power loss is low compared to systems that use the engine's rotation to generate hydraulic pressure, is receiving attention for its efficiency. In the motors employed in such EPAS systems, a diverse variety of electronic components that serve to realize high-precision motor control is surface-mounted onto a circuit board.

Among the electronic components for realizing high-precision control, Hall-effect sensors in particular, for detecting the rotational position of the poles of the magnetic-field producing magnet(s) in the rotor section of the motor, are accurately disposed in predetermined areas to detect the rotational position of the field magnet poles with high precision. Accurately disposing the Hall sensors enables efficient control of the armature current, whereby the efficiency with which the motor is driven is thus improved. Consequently, in motors that use Hall-effect sensors, adjustment of the position of the sensing elements is paramount. Nevertheless, in motors to date, low-cost, sufficiently exact locating of the Hall-effect sensors has not been achieved.

Moreover, demands are for automotive vehicles that run in good order over the long term. Consequently, high reliability is in turn being demanded of EPAS motors as one of the mechanical components of more reliable, longer-lasting vehicles. For that reason, in motors used in devices for assisting vehicle driving operations, the electronic components should be mounted firmly onto the circuit board so that not even one will come loose and fall off. Yet there has been a need to maintain high motor reliability also by secondary measures against adverse consequences in the rare event an electronic component should come loose and fall off. With motors to date, however, no motor in which such secondary measures have been implemented has existed.

BRIEF SUMMARY OF THE INVENTION

The present invention in electrically powered motors enables the positions of the armature core and the sensor-mounting member relative to each other to be easily and accurately determined. In addition, by restricting movement of an electrical component in the unlikely event that the component should come out of its fixed position, the invention contributes to improving motor reliability.

The present invention in one example comprises: a stator section including an armature; a rotor section having a field magnet for generating, between itself and the armature, torque that centers on a predetermined center axis; and a bearing mechanism, centered on the center axis, for rotatably supporting the rotor section with respect to the stator section. The stator section includes sensors for detecting the position of the field magnet, and a sensor mounting member, attached either directly or indirectly to the armature, for retaining the sensors.

The stator section further includes: a busbar disposed on one end of the armature with respect to its orientation extending along the center axis, and inside of which conductors for supplying drive current to the armature are provided; and a circuit board installed on the upper side of the busbar.

A circularly arcuate recess for accommodating the sensor mounting member is proved in the inner circumferential surface of the busbar, and a recess that covers the electronic components on the circuit board is provided in the upper surface of the busbar.

Leading-edge projections directed toward the busbar are provided on the leading-edge face of the sensor mounting member opposite its circuit-board side, and recesses into which the leading-end projections insert are provided in the busbar. This may also be accomplished with lateral-surface projections that jut out from a lateral surface of the sensor mounting member, heading toward the busbar for an extent, then jut in a direction heading reverse to the circuit board, and with recesses provided in the busbar for accommodating these projections.

The armature includes a first alignment feature that seats on a predefined jig; and in the sensor mounting member is included a second alignment feature in which the jig in turn seats, rendering between the two alignment features a locating gauge. In addition, in the circuit board is provided with a groove feature that matches circumferential position with the first and second alignment features.

The sensor mounting member and the circuit board are fastened together by thermal welding.

In a motor of the present invention, the provision of the aligning features in the sensor mounting member, the armature core, and the circuit board enables the Hall sensors to be positioned accurately, which contributes to improving the motor's efficiency.

Furthermore, in a motor of the present invention, the electronic components surface-mounted on the circuit board being accommodated in a recess in the busbar, and the circuit board and the busbar being thermally welded to firmly fasten them together contribute to improving the dependability of the motor.

From the following detailed description in conjunction with the accompanying drawings, the foregoing and other objects, features, aspects and advantages of the present invention will become readily apparent to those skilled in the art.

DETAILED DESCRIPTION OF THE INVENTION

Figure 1:
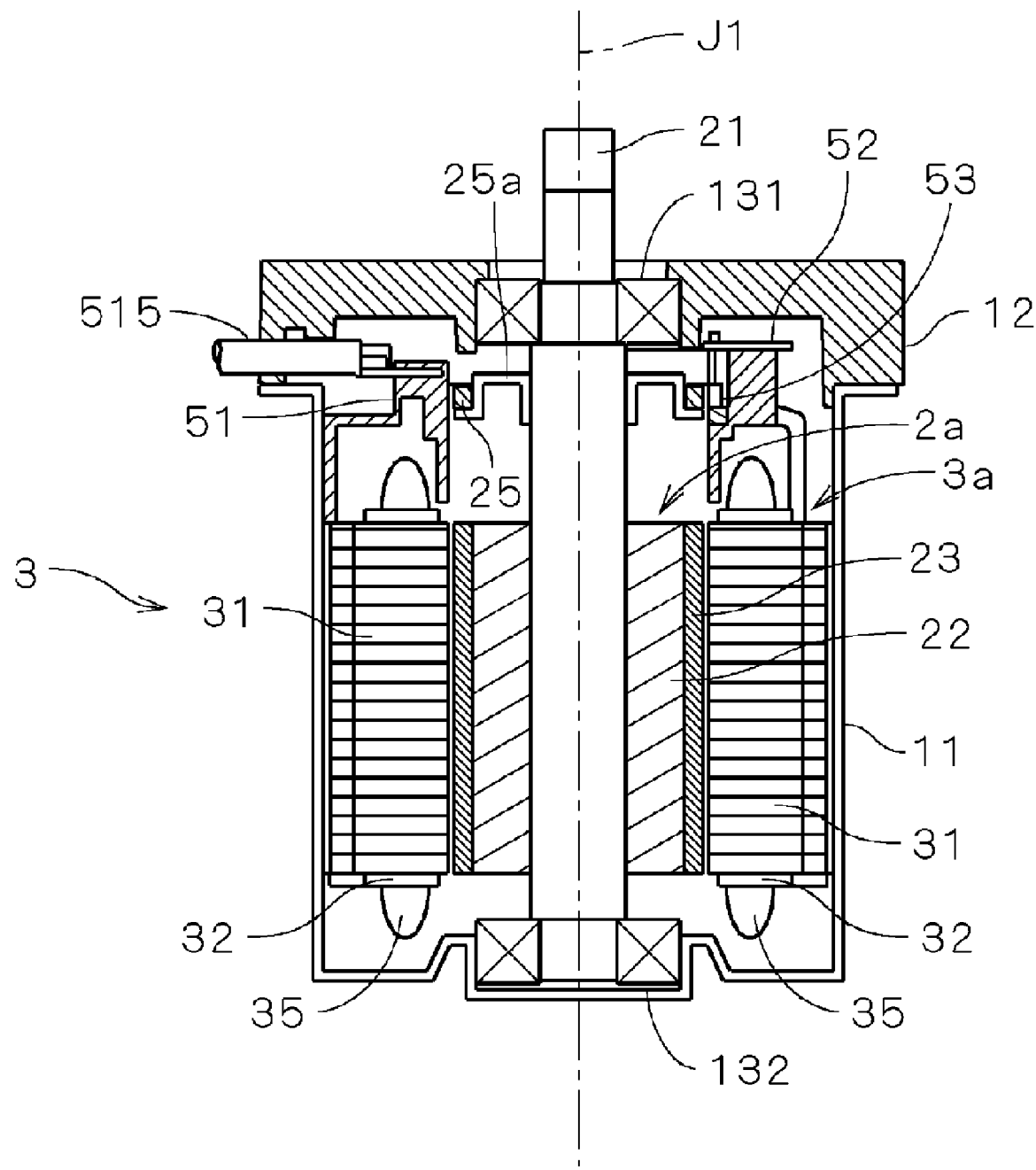
FIG. 1 is a schematic sectional view illustrating one embodiment of a motor involving the present invention.

Reference is made to FIG. 1, a vertical section view of an electrically powered motor 1 involving one embodiment of the present invention. The motor 1 is a so-called brushless motor, and is employed, for example, as a drive source that assists steering operations in an automobile power-steering system. (It should be noted that the shading by parallel diagonal lines has been omitted from the sectional illustration of the finer features in FIG. 1.) The motor 1 is covered by a cylindrical housing 11 that is open along the upper end in FIG. 1, and by a cover part 12 that closes over the opening in the housing 11, and in the center of which an opening is formed. Further, ball bearings 131 and 132 are respectively mounted in the opening in the cover part 12, and in the base of the cylindrical housing 11. The motor shaft 21 is rotatably supported by the ball bearings 131 and 132.

A columnar rotor yoke 22 in the housing 111 interior is attached to the shaft 21. In turn, a field magnet 23 that is magnetized to have numerous poles is fixed to the outer circumferential surface of the rotor yoke 22. For the field magnet 23, a sintered material incorporating neodymium is, for example, employed. On the stationary side on the other hand, an armature 3 is attached to the inner circumferential surface of the housing 11, opposing the field magnet 23. The armature 3 is disposed so that the center axis J1 of the armature 3 coincides with the center axis of the shaft 21. The armature 3 is furnished with: a plurality of teeth 31 radiating, with the teeth forward edges directed toward the center axis J1, converging on the center axis J1 from the inner circumferential surface of the annular portion of a core 30 composed of a magnetic substance (in other words, extending from the inner circumferential surface of the housing 11, towards the shaft 21 and field magnet 23); insulators 32 covering the plurality of teeth 31; and coils 35 provided by wrapping conducting wires onto the plurality of teeth, from atop the insulators 32 into multiple layers. The coils 35 are formed by winding the conducting wires heading up and down (along the center axis J1) on the outer periphery of the teeth 31 and the insulators 32.

A busbar 51 inside of which are provided conducting plates for supplying motor drive current to the coils 35 of the armature 3 is mounted on the cover-piece 12 side of the armature 3 endwise with respect to the center axis J1. Further, the busbar 51 is connected to each coil 35 and to wires 515 that extend to the exterior. A board for detection circuitry, on which later-described Hall-effect sensors and associated components are mounted, is installed on the busbar 51, attached to its cover-piece 12 side.

In the motor 1, a rotor section 2a whose principal components include the shaft 21, the rotor yoke 22, and the field magnet 23 is constituted, and a stator section 3a whose chief components include the armature 3, the busbar 51, and the circuit board 52 is constituted. The ball bearings 131 and 132 therein play the role of a bearing mechanism that supports the rotor section 2a enabling it to rotate, on the center axis J1 as the rotational center, relatively with respect to the stator section 3a. Thus, by supplying drive current to the armature 3 via the busbar 51, torque centered on the center axis J1 develops between the armature 3 and the field magnet 23, rotating the rotor section 2a.

On the busbar 51 side of the circuit board 52, together with various other electronic components, three Hall-effect sensors 53 are mounted jutting downward. The Hall sensors 53 therein are retained in a sensor holder to be described later. Meanwhile, via a flange 25a composed of a magnetic substance, an annular magnet 25 for sensing use is mounted along the shaft 21, to the cover-piece 12 side of the field magnet 23, wherein the sensing magnet 25 opposes the Hall sensors 53. Like the field magnet, the sensing magnet 25 is magnetized to have numerous poles; and by the Hall sensors 53 detecting the position of the sensing magnet 25, the position of the field magnet 23 is detected indirectly. The drive current to the armature 3 is then controlled based on the detection results.

Figure 2:
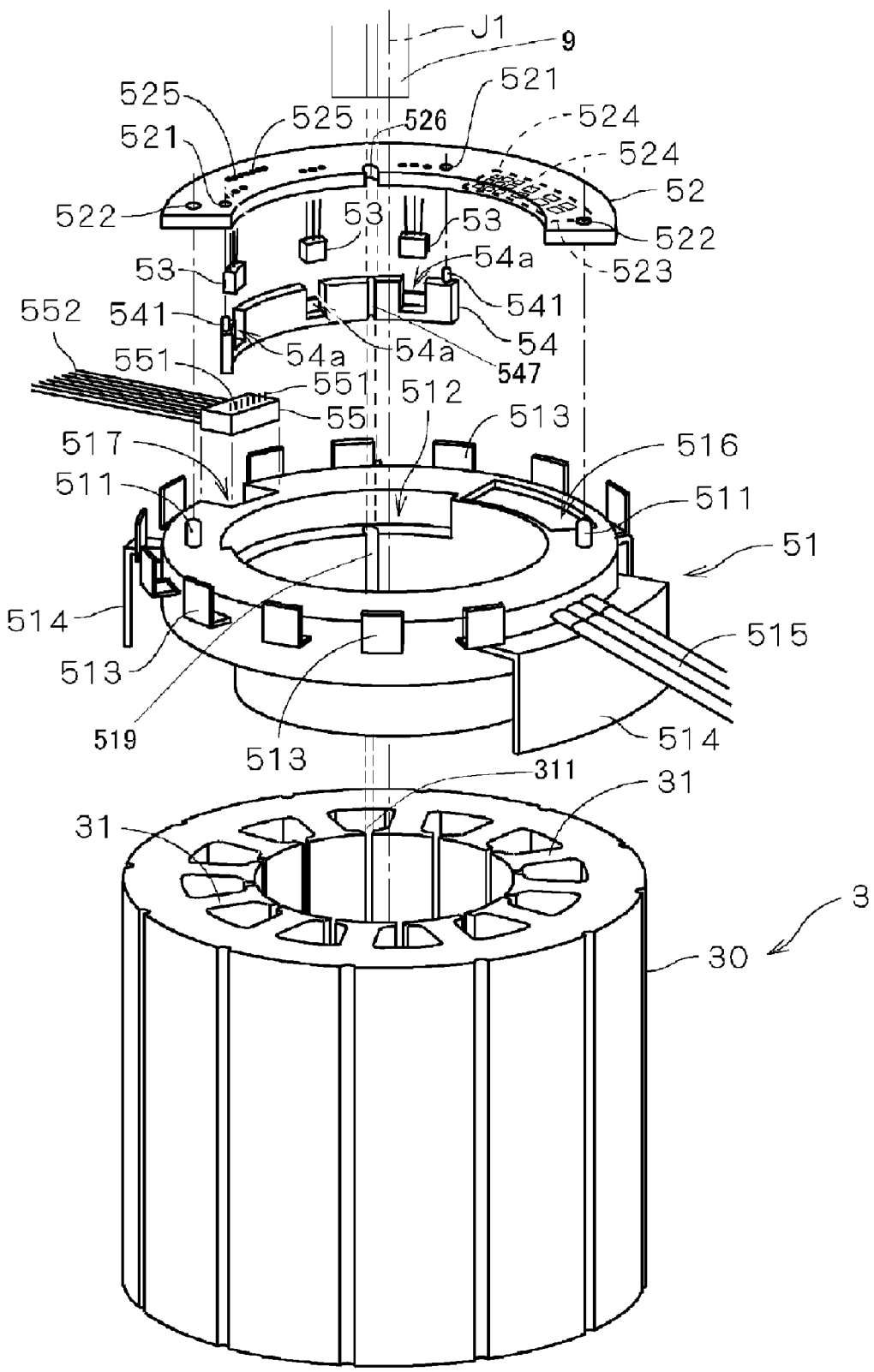
FIG. 2 is an oblique view depicting one embodiment of the stator section of a motor involving the present invention.

The description now turns to FIG. 2, which is an oblique, exploded view illustrating the principal makeup of the stator section 3a. As regards the armature 3, only the core 3 thereof is depicted in FIG. 2, but in actuality, when the busbar 51 is mounted onto the armature 3, the teeth 31 of the core 30 are covered by the insulators 32. At that time, moreover, an armature 3 in which conducting wire is wrapped on over the top of the insulators 32 to form the coils 35 has been readied (cf. FIG. 1).

The roughly cylindrical busbar 51 is cast by laminating four arcuate conductor plates 518 (cf. FIG. 5) spaced apart along the orientation of the center axis J1, and resin-molding the conductor plates 518 so that only terminals 513 protruding out from each are exposed on the busbar exterior. As indicated in FIG. 2, formed in the surface of the busbar 51 on its circuit board 52 side are: a first recess 516 that opposes a portion of the circuit board 52; a second recess 517 in which a connector 55, which is an electronic component connected with an external wiring set 552, is accommodated; and a third, arcuate recess 512 in which an arcuate sensor holder 54, made of a synthetic resin, is accommodated.

The busbar 51 is then attached to the armature 3 by inserting a cylindrical portion of the busbar 51, provided on the bottom of the central opening therein, into the central opening in the armature core 30, and crimping the conductor wires from the coils 35, whose illustration is omitted from FIG. 2, corresponding to each tooth 31 to connect the wires to the terminals 513 on the busbar periphery. During that process, a plurality of leg pieces 514 provided on the outer periphery of the busbar 51 lands on the upper surface of the core 30. By the fore ends of the leg pieces 514 then being engaged into vertical slots in the circumferential surface of the core 30, the position of the busbar 51 with respect to the core 30 is determined.

Along the surface of the circuit board 52 on its busbar 51 side, IC chip components 524, which are microelectronic parts, have been surface-mounted beforehand in the area (termed "recess-opposing area" hereinafter) 523 that opposes the first recess 516. In the present embodiment, all of the plural chip components 524 are surface-mounted on the circuit board 52 in the recess-opposing area 523. It should be noted that "surface mounting" signifies a mounting technique by which the terminals of the chip components 524 are anchored firmly into electrodes in the front side of the circuit board 52, and the mounting technique is suited to scaling-down the area required for mounting the chip components 524. With a motor 1 of which, as a drive source for automobile power steering, downscaling is demanded, surface mounting the plurality of chip components 524 enables the circuit board 52 to be reduced in size.

As regards the circuit board 52, the connector 55 is mounted on the surface of the circuit board 52 on its busbar 51 side. The terminals 551 of the connector 55 are inserted into holes 525 formed in lands on the circuit board 52, and are fixed to the circuit board 52 by soldering. While the chip components 524, the connector 55, and the Hall sensors 53 are mounted on the surface on one side of the circuit board 52, according to the mounting technique, the solder areas are put on the surface on the mutually opposing side. Accordingly, when soldering the connector 55 and the Hall sensors 53 to a circuit board 52 on which the chip components 524 have been mounted, the soldering operation can be carried out without injuriously compromising the already mounted chip components 524. Meanwhile, with the Hall sensors 53 having been inserted into and retained by respective recesses in the sensor holder 54, and with leads from the Hall sensors 53 having been inserted into holes formed in lands on the circuit board 52 on which the other electronic components have been mounted, the sensor holder 54 is fixed to the circuit board 52. The leads are then fixed to the circuit board 52 by soldering, to leave the Hall sensors 53 protruding from the mounting surface of the circuit board 52. Two attachment pins 541 are provided on the circuit-board 52 side of the sensor holder 54, with holes 521 being provided in corresponding locations in the circuit board 52. Installation of the sensor holder 54 is then carried out by inserting the attachment pins 541 into the holes 521, and subjecting the pins 541 to a thermal welding process in which they are heat-melted and squashed. The sensor holder 54 installation completes the mounting of the electronic components, including the Hall sensors 53, to the circuit board 52. The sensor-holder 54 recesses that cover the Hall sensors 53 are lent a form in which the Hall sensors 53 are cradled along both sides without gaps, wherein the Hall sensors 53 are retained in an immobile state by the sensor holder 54. Accordingly, the relative arrangement of the plural Hall sensors 53—that is, the inter-sensor pitch angle centered on the center axis J1—can be set readily and accurately, and mounting of the plurality of Hall sensors 53 collectively onto the circuit board 52 can be carried out with ease. What is more, even if the post-mounting Hall sensors 53 should come into contact with some obstacle, the Hall sensors 53 are prevented from slipping out of position.

Two anchor pins 511 are furnished on the upper surface of the busbar 51, with two holes 522 sufficiently large (that is, having adequate play) with respect to the anchor pins 511 being provided in the circuit board 52. Once a circuit board 52 on which Hall sensors 53 have been mounted has been readied, the anchor pins 511 are inserted into the holes 522 to provisionally anchor the circuit board 52 and the sensor holder 54 with respect to the busbar 51. This in turn provisionally anchors the circuit board 52 and the sensor holder 54 to the core 30 indirectly, via the busbar 51, which is an intermediate member. With the arcuate recess 512 being provided in the inner circumferential surface of the busbar 51, the arcuate sensor holder 54 is inset into the recess 512. The recess 512 is, however, formed to be a bit large such that the two end portions of the sensor holder 54 relative to either circumferential direction about the center axis J1 as the center will not contact both ends of the recess 512 at the same time.

Figure 3A:
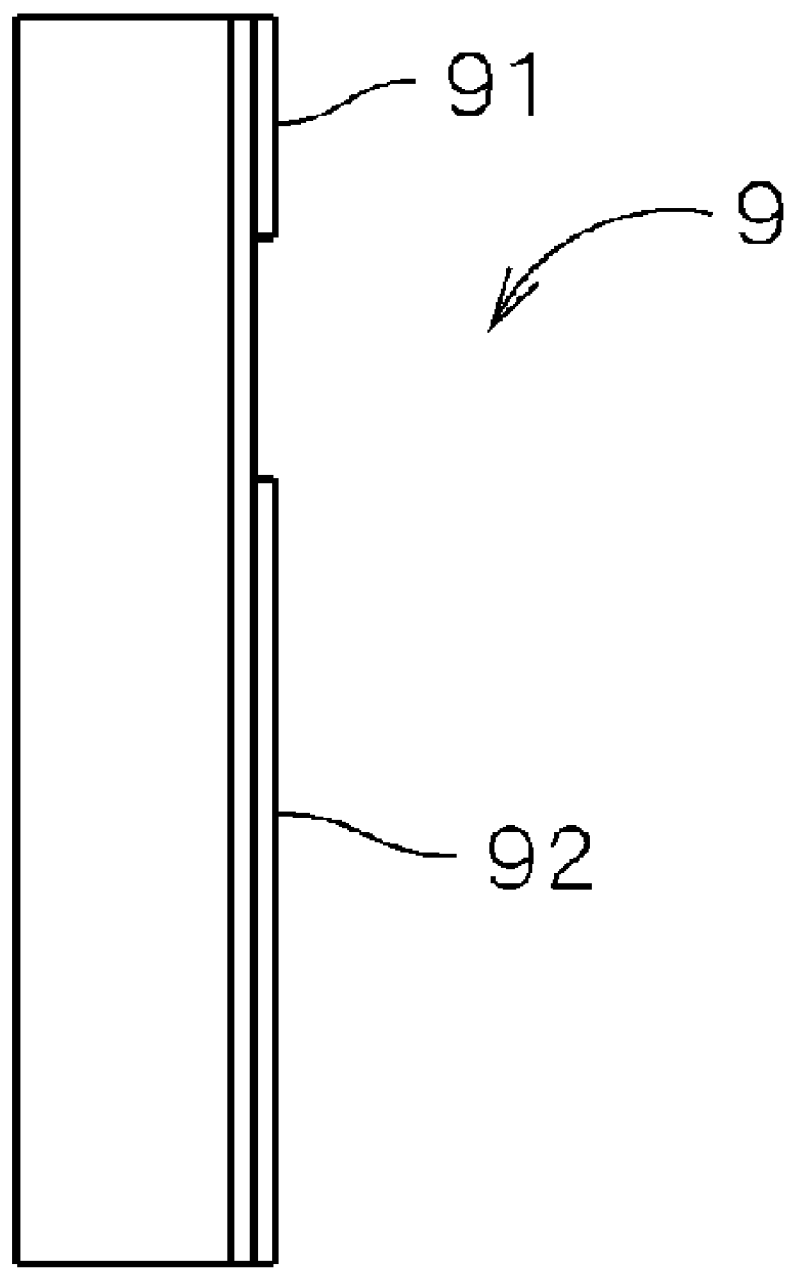
FIG. 3A is a schematic side view representing one embodiment of a jig.
Figure 3B:
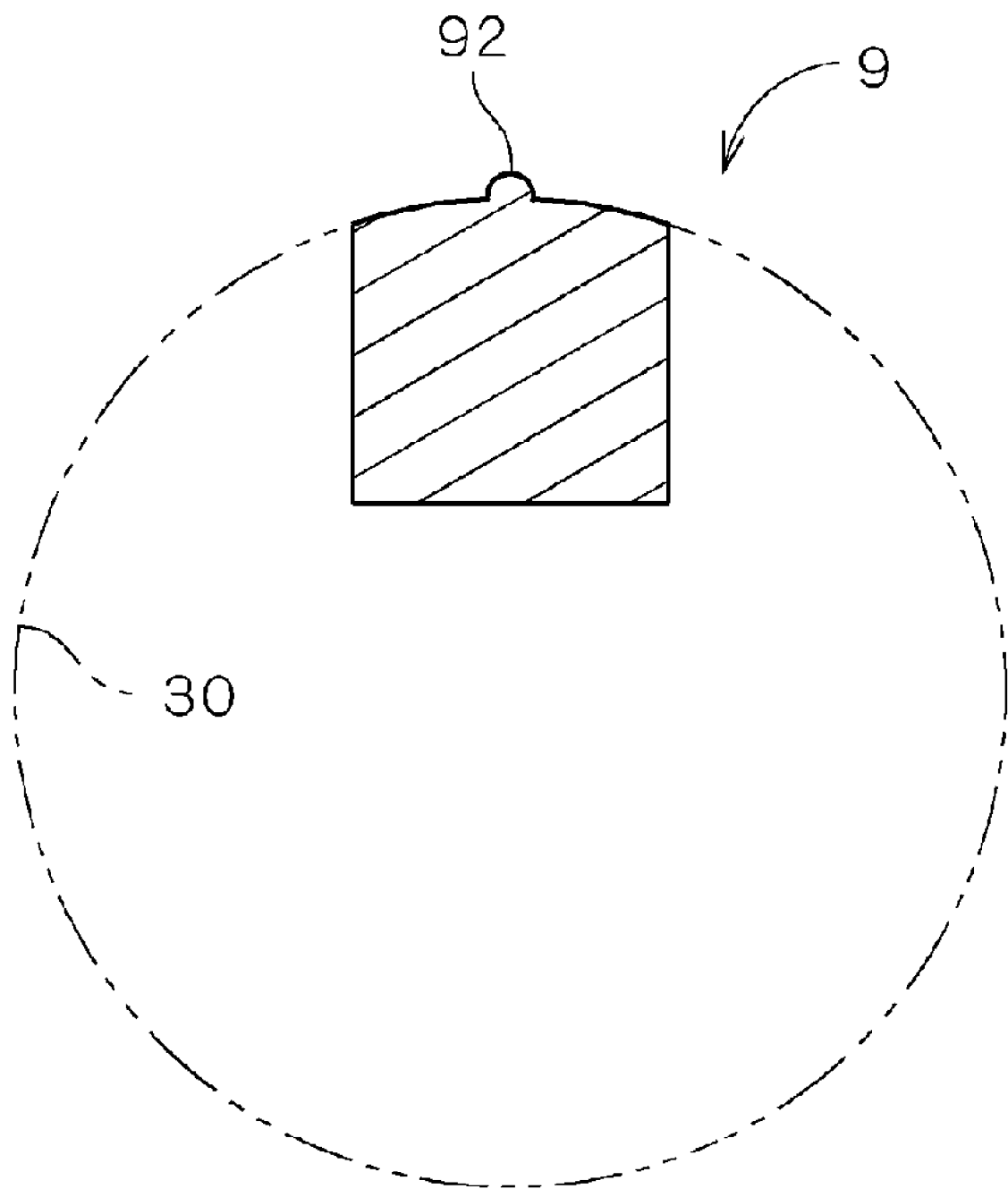
FIG. 3B is a cross-sectional view of the jig, with the armature core from the motor stator section outlined in phantom.

Next, with the assembly in the provisionally anchored state, a jig 9 is utilized to accurately determine the relative position of the sensor holder 54 with respect to the core 30. In FIG. 2, only the surface on a tiny portion of the jig 9 is portrayed, but in FIG. 3A, a lateral view of the entire jig 9 is presented; and in FIG. 3B, a transverse section taken through the lower portion of the jig 9 is presented. In FIG. 3B, the inner circumferential surface of the core 30 (the leading edge of the teeth 31) is indicated in phantom. As shown in FIGS. 3A and 3B, the jig 9 is virgate in form, with two ridges 91 and 92 extending up and down being formed in a single straight line on a side thereof.

When the assembly is to be brought into alignment, the jig 9 is inserted into the central openings in the busbar 51 and—as indicated in FIG. 3B—in the core 30, the ridge 92 on the lower end of the jig 9 is matched with and seated into a gap 311 (a so-called slot opening, cf. FIG. 2) in between the teeth 31, and the ridge 91 on the upper end of the jig 9 is matched with and seated into a groove 547 (cf. FIG. 2) formed in the rim surface of the sensor holder 54 along the center axis J1, slightly shifting the circuit board 52 and the sensor holder 54 into positional adjustment to determine the relative position of the sensor holder 54 with respect to the core 30 and accurately position the groove 547 in the sensor holder 54 on a line extending in the center axis J1 orientation in the gap 311 in between the teeth 31. Along the line joining the gap 311 and the groove 547, as indicated in FIG. 2, larger grooves 519 and 526 are formed respectively in the busbar 51 and circuit board 52 in order to avert interference with the jig 9.

Once the alignment of the sensor holder 54 has been completed, with the jig 9 still seated in the core 30 and sensor holder 54 the circuit board 52 is firmly fixed to the busbar 51 by the thermal welding process in which the attachment pins 511 are heat-melted and squashed. This means that the sensor holder 54—a member in which the Hall sensors 53 are mounted—is via the busbar 51 fixed relative to the core 30. Following the thermal welding process, the jig 9 is removed from the core 30, the sensor holder 54, etc.

Figure 4:
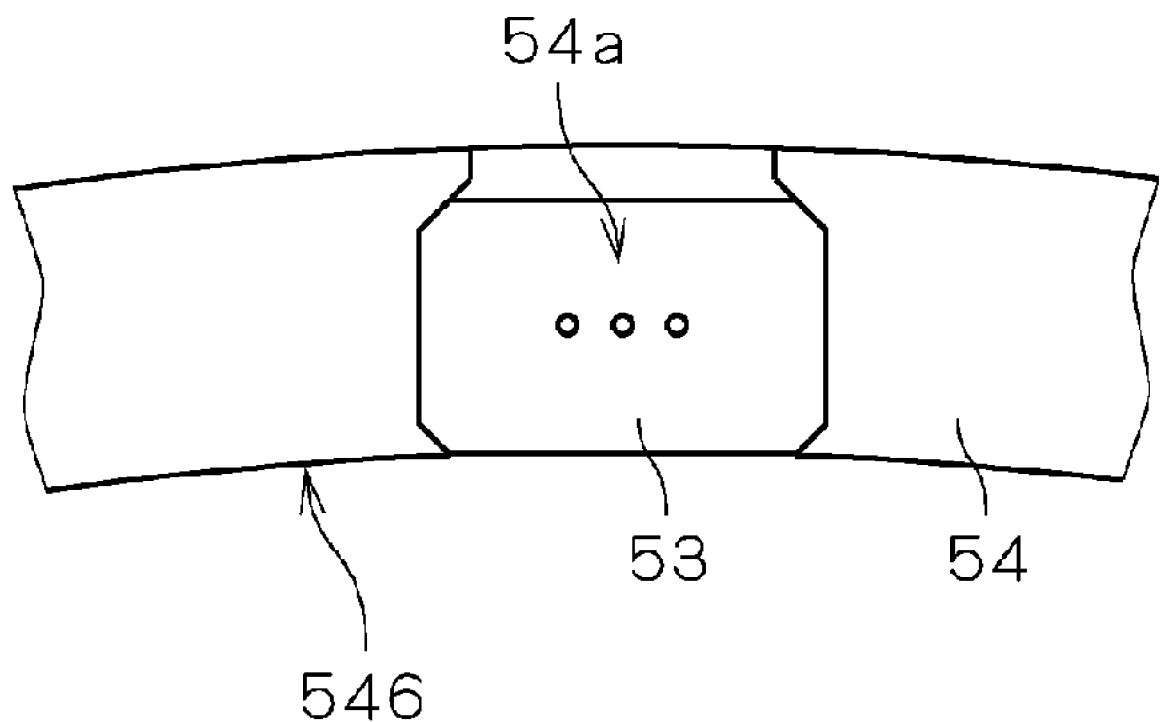
FIG. 4 is a diagram representing, in an enlarged plan view, a portion of a sensor mounting member.

The description turns now to FIG. 4, which is an enlarged plan view fragmentarily illustrating the sensor holder 54 with a Hall sensor 53 having been inserted into it. As represented in FIG. 4, the sensor-holder 54 recess 54a covering the Hall sensor 53 is of a form that cradles either side of the Hall sensor 53 without a breach, wherein the Hall sensor 53 is retained immobilized by the sensor holder 54, with the sensing surface of the Hall sensor 53 put virtually flush with the sensor-holder 54 surface 546 (referred to as the "holder inside surface" hereinafter) that is directed toward the center axis J1 (cf. FIG. 2). The sensor holder 54 is thus of a form that enables the relative arrangement of the plural Hall sensors 53—that is, the inter-sensor pitch angle centered on the center axis J1—as well as the arrangement of the Hall sensors 53 relative to the sensing magnet 25, to be set readily and accurately, and enables mounting of the plurality of Hall sensors 53 collectively onto the circuit board 52 to be carried out with ease. What is more, even if the post-mounting Hall sensors 53 should come into contact with some obstacle, the Hall sensors 53 are prevented from slipping out of position.

Once the connector 55 and the sensor holder 54 have been mounted onto the circuit board 52, the two attachment pins 511, which are made of a synthetic resin, provided on the upper surface of the busbar 51 are, as indicated in FIG. 2, inserted into the holes 522 in the circuit board 52 and alignment of the sensor holder 54 with respect to the core 30 is carried out, after which the circuit board 52 is securely fastened to the busbar 51 by the thermal welding process in which the attachment pins 511 are heat-melted and smashed.

Figure 5:
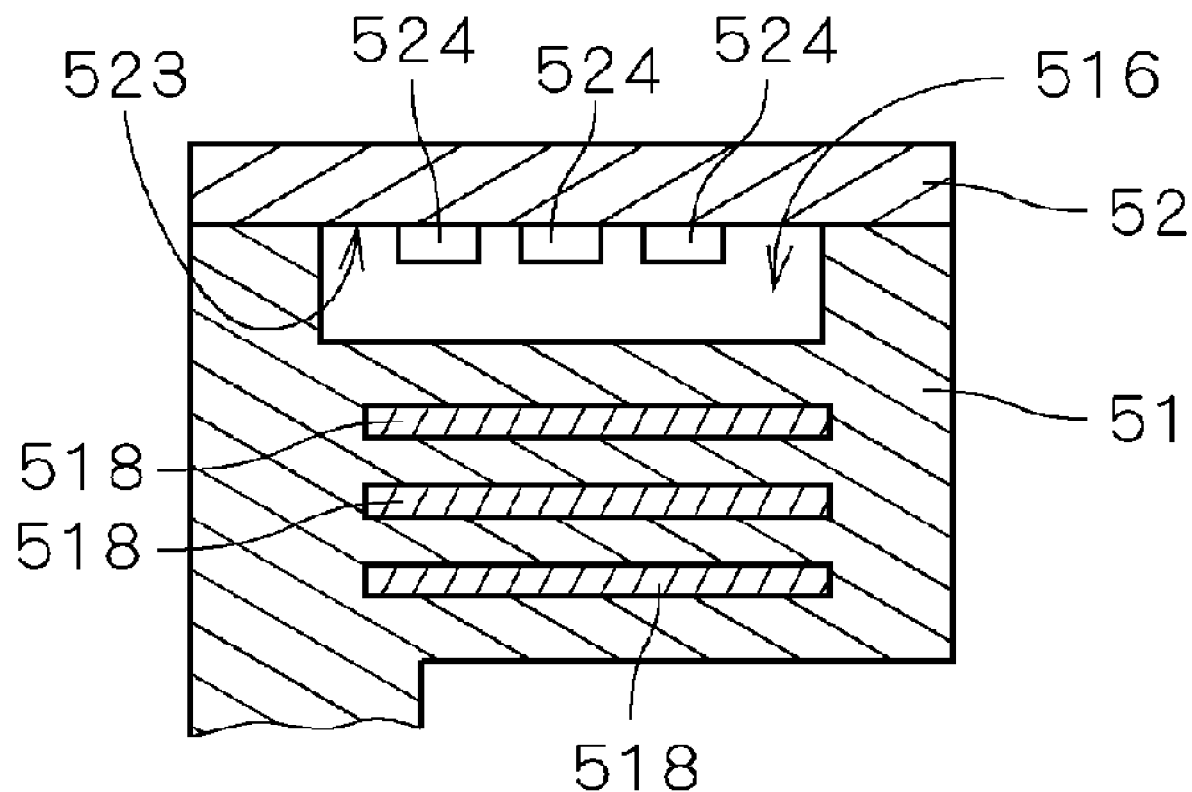
FIGS. 5 and 6 are respective schematic sectional views representing a circuit board and, fragmentarily, a busbar.
Figure 6:
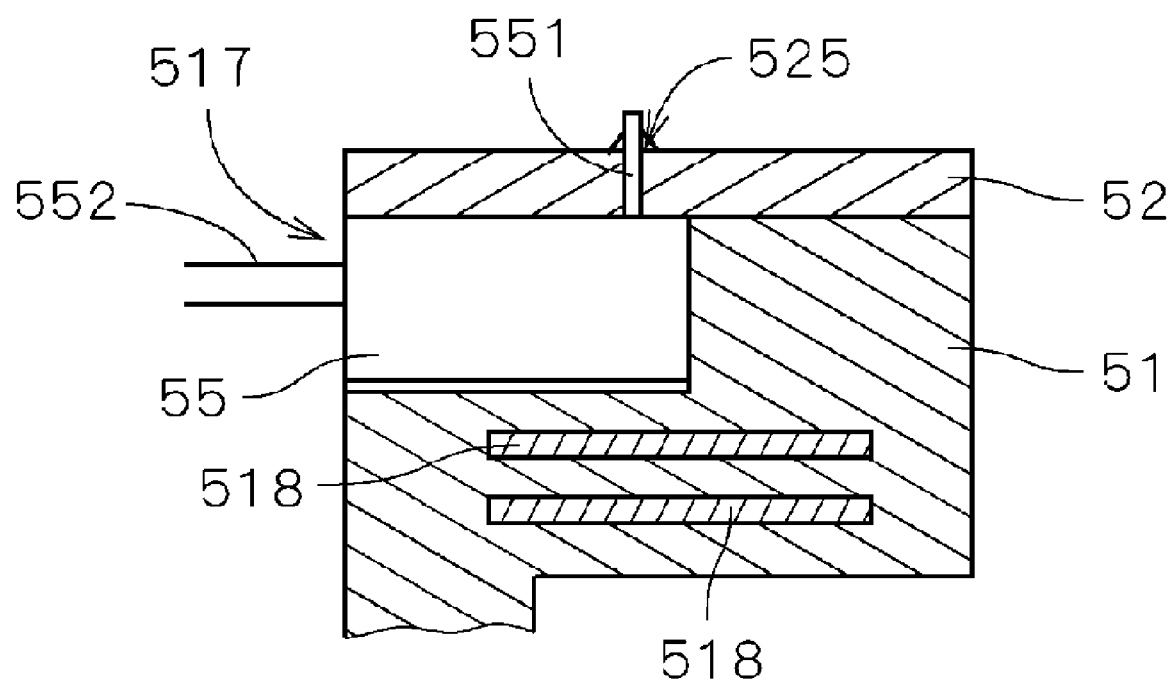
Figure 8:
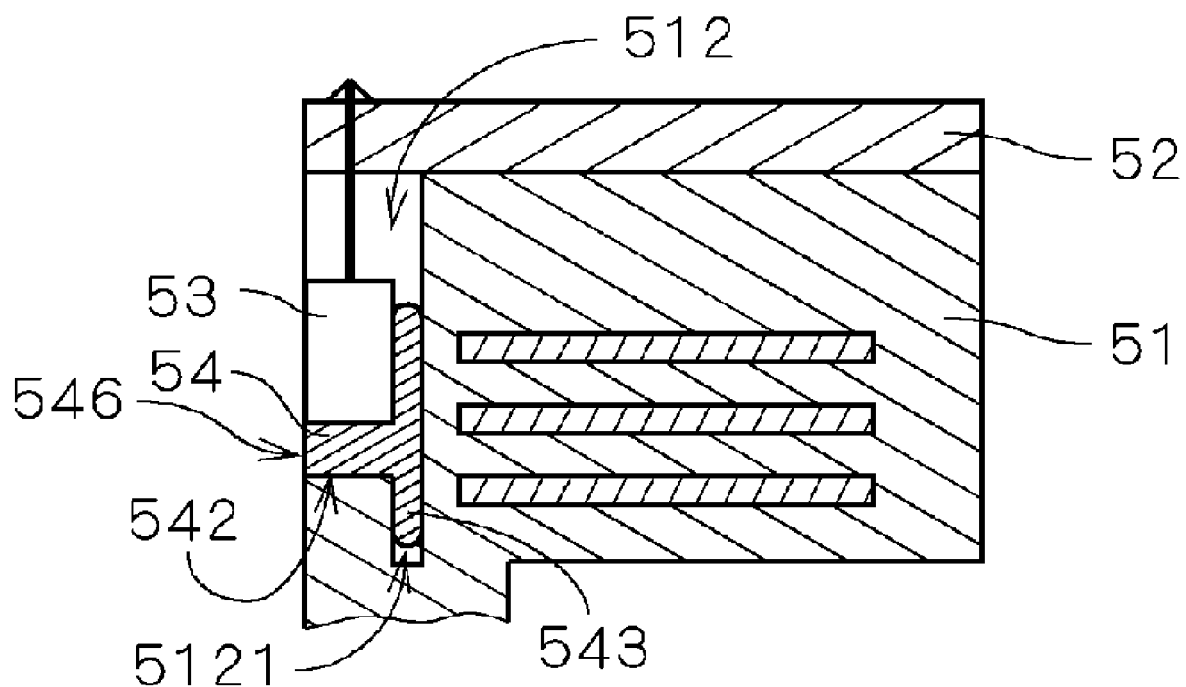
FIGS. 8 and 9 are respective schematic sectional views representing a circuit board and, fragmentarily, a busbar.
Figure 9:
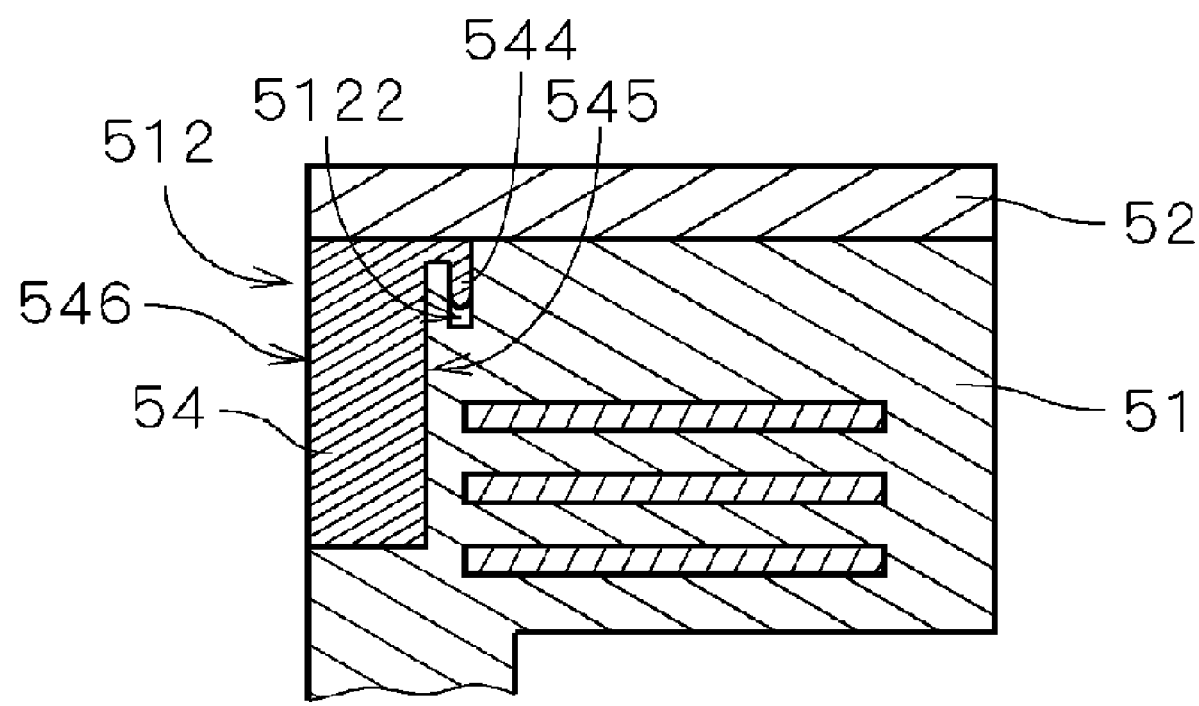

Reference is made to FIG. 5, a sectional view of the busbar 51 and circuit board 52 taken through the location of the first recess 516 in the busbar 51, in which only a portion of the busbar 51 is represented (as is also the case with FIGS. 6, 8 and 9). In the stator section 3a, by the circuit board 52 being attached to the busbar 51, as indicated in FIG. 5, the chip components 524 mounted on the recess-opposing area 523 of the circuit board 52—that is, all of the chip components 524 mounted on the front side of the circuit board 52—are in the first recess 516 enveloped by the busbar 51.

In FIG. 6, a sectional view of the busbar 51 and circuit board 52 taken through the location of the second recess 517 is presented. As indicated in FIG. 6, the terminals 551 on the connector 55 connected with the external wiring set 552 are inserted into the holes 525 in the circuit board 52, and the circuit-board 52 directed face of the connector 55 is seated onto the busbar 51 side of the circuit board 52 to mount the connector 55 onto the circuit board 52. Meanwhile, the second recess 517 in the busbar 51 is formed so as to be slightly greater than (or equal to) in depth to the thickness of the connector 55. The depth of the second recess 517 is dimensionally proportioned for the connector 55 terminals 551 to stay inserted in the holes 525 in the circuit board 52, even if the solder on the terminals 551 is dislodged. This dimensioning is in order that the connector 55 not bulge out along the depth direction of the second recess 517, nor directly drop out of the second recess 517, due to factors such as discrepancies in molding the second recess 517, or the connector 55 mounting position being off. Another feature of the busbar 51 configuration is that the conductor plates 518 are arranged circumferentially staggered so as not to be exposed from the first recess 516 and the second recess 517. In the stator section 3a, by the circuit board 52 being attached to the busbar 51, the connector 55 is accommodated in the second recess 517, bringing the surface of the connector 55 alongside the busbar 51 adjacent to (or seating it on) the opposing surface on the busbar 51 (that is, the floor of the second recess 517, which is a portion of the surface of the busbar 51 along its circuit-board 52 side). In other words, as mounted on the circuit board 52, the connector 55, except for its outer-side surface, is in the second recess 517 enveloped by the busbar 51.

Figure 7:
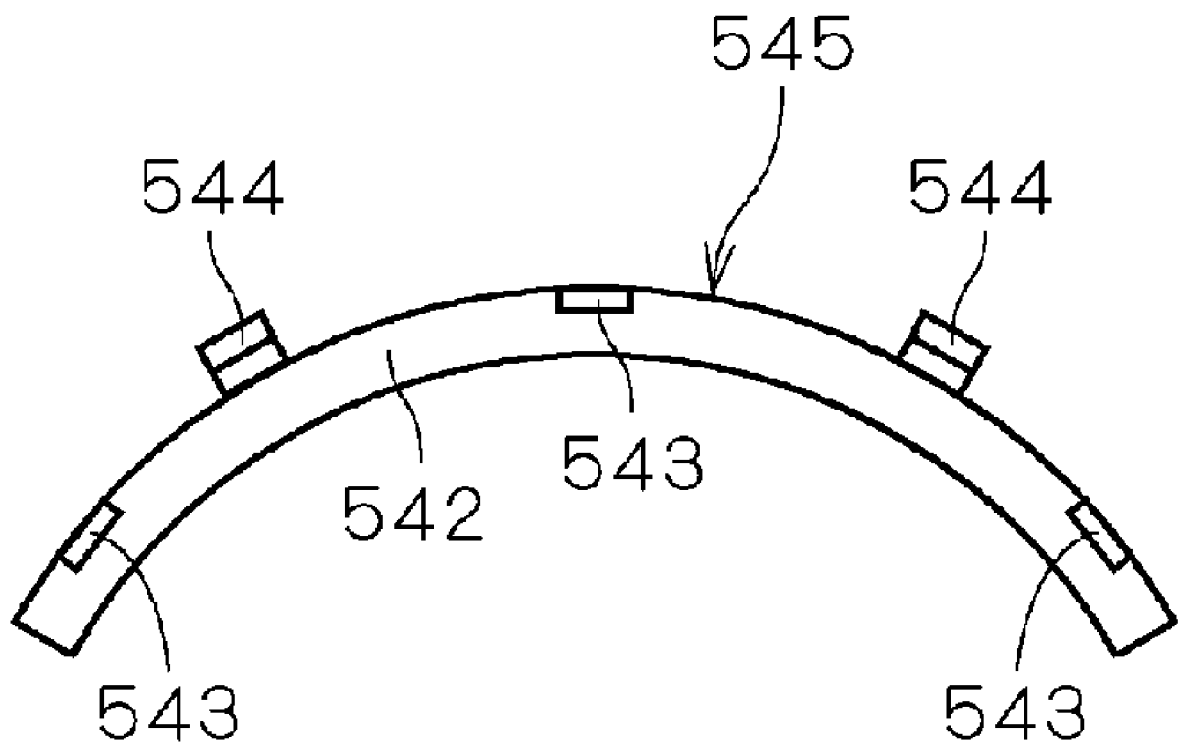
FIG. 7 is an underside view of the sensor mounting member.

The description now turns to FIG. 7, which is an underside view of the sensor holder 54. As indicated in FIG. 7, the arcuate sensor holder 54 is furnished with three leading-edge projections 543 in locations on the outer peripheral side (i.e., the side farther from the center axis J1 [cf. FIG. 2]) of the leading-edge surface 542 (referred to as "holder bottom surface" hereinafter) on the side of the sensor holder 54 opposite its circuit-board 52 side (cf. FIG. 2). The sensor holder 54 is further furnished with two L-shaped lateral-surface projections 544 on the circuit-board 52 side of the holder outside surface 545, which is the lateral surface on the side farther from the center axis J1 (again, cf. FIG. 2). In FIG. 8, a sectional view of the busbar 51 and circuit board 52 taken through the location of a leading-edge projection 543 is presented; and in FIG. 9, a sectional view of the busbar 51 and circuit board 52 taken through the location of a lateral-surface projection 544 is presented.

In mounting the circuit board 52 onto the busbar 51—which nests the sensor holder 54 into the busbar's third recess 512—with the holder bottom surface 542 of the sensor holder 54, which at this point retains the Hall sensors 53, opposing the floor of the third recess 512, the leading-edge projections 543 jutting from the holder bottom surface 542 toward the busbar 51 are, as indicated in FIG. 8, inserted into small floor recesses 5121 formed in the floor of the third recess 512. At the same time, with the holder outside surface 545 opposing the lateral surface of the third recess 512, the L-shaped lateral-surface projections 544, which jut out from the holder outside surface 545, head toward the lateral surface of the third recess 512 for an extent, then jut in the direction heading opposite the circuit board 52 are, as indicated in FIG. 9, inserted into small wall recesses 5122 provided in the busbar 51. In this way the sensor holder 54 is with superior reliability anchored into the busbar 51 by means of the leading-edge projections 543 and the lateral-surface projections 544, which are engagement features that engage into the busbar 51.

As also indicated in FIGS. 8 and 9, the sensor holder 54 is accommodated in the third recess 512 such that the holder inside surface 546 coincides with the inner circumferential surface of the busbar 51, and such that the sensing surfaces of the Hall sensors 53 are, as noted earlier, virtually flush with the holder inside surface 546. As a result, with the inner diameter of the busbar 51 being minimized to scale the busbar 51 down, the Hall sensors 53 can be disposed in close proximity to the annular sensing magnet 25 (cf. FIG. 1), enabling the Hall sensors 53 to perform detection of the position of the field magnet 23 with greater precision.

As described in the foregoing, in the motor 1 the fact that the chip components 524 on the circuit board 52 are covered by the first recess 516 makes it possible to restrict movement of the chip components 524 to the interior of the first recess 516 in the unlikely event that a chip component 524 comes out of its fixed position on the circuit board 52. Rendering the motor 1 to have a structure of this sort enables preventing secondarily adverse consequences when the chip components 524 are populated by surface mounting—such as a loose chip component 524 encroaching on the rotor section 2a and having an impact on the rotational characteristics of the motor 1—to contribute to improving the dependability of the motor 1. In addition, the chip components 524 being accommodated in the first recess 516 prevents foreign matter arising in the motor 1 interior from sticking to the chip components 524 and causing a short, whereby improved motor 1 dependability is realized. In the motor 1, the fact that the all of the chip components 524 on the circuit board 52 are covered by the first recess 516 enables the reliability of the motor 1 to be improved.

The terminals 551 on the connector 55 are inserted into the holes 525 in the circuit board 52 and soldered to the surface of the circuit board 52 on the side opposite the side where the connector 55 is positioned, and with the surface on the busbar 51 side brought adjacent to (or seated on) the floor of the second recess 517, the connector 55 is accommodated into the second recess 517. This creates a situation in which, even if the connector 55 is tugged at through the external wiring set 552 in the direction in which the connector 55 would separate from the busbar 51, the terminals 551 will not come out of the holes 525 but will stay retained in the circuit board 52, which prevents the connector 55 from dropping out of the circuit board 52 to contribute further to improving the dependability of the motor 1. Furthermore, even should the connector 55 happen to come loose, the fact that it is covered by the second recess 517 enables preventing secondarily adverse consequences such as the loose connector 55 encroaching on the rotor section 2a and having an impact on the rotational characteristics of the motor 1. In addition, the connector 55 being accommodated in the second recess 517 makes it possible to prevent foreign matter arising in the motor 1 interior from sticking to the connector 55 and causing a short.

In the motor 1, the fact that the sensor holder 54 is fixed by thermal welds to the circuit board 52 enables preventing, with greater dependability compared with other bonding means (such as adhesives or screw-fastening), the sensor holder 54 from falling out. What is more, even in the unlikely event that the thermally welded regions (the areas of the attachment pins 541 on the sensor holder 54) become damaged, the fact that the leading-edge projections 543 are inserted into the floor recesses 5121 to engage the sensor holder 54 into the busbar 51 provides for securely preventing the sensor holder 54 from coming loose from the circuit board 52. Additionally, the lateral-surface projections 544 being inserted into the wall recesses 5122 further provides for securely preventing the sensor holder 54 from falling off. In sum, even if a primarily adverse condition due to damage to the thermal-weld portions of the sensor holder 54 should happen to occur, because the occurrence of secondarily adverse consequences—such as the sensor holder 54 slipping out and giving rise to mis-mounting of the Hall sensors 53, or the sensor holder 54 and Hall sensors 53 coming into contact with the rotor section 2*a* and having a negative impact on its rotation—is prevented nonetheless, the motor 1 realizes superior dependability.

A further advantage is that in inserting the sensor holder 54 into the busbar 51, by the leading-edge projections 543 being engaged into the floor recesses 5121, and the lateral-surface projections 544 being engaged into the wall recesses 5122, mis-attachment in which the sensor holder 54 becomes anchored out-of-joint with respect to the third recess 512 can be assuredly prevented. Although either the leading-edge projections 543 or the lateral-surface projections 544 would serve in this regard, it is desirable that both sets of projections be present.

The motor 1 is thus suited to automobile power steering drive sources, which call for superior dependability.

Finally, inasmuch as the electronic components (the chip components 524, the connector 55, and the Hall sensors 53) atop the circuit board 52 are all surface-mounted on the board's busbar 51 side and accommodated by predetermined recesses into the thickness of the busbar 51 (i.e., the orientation along which the center axis J1 is directed), the dimension of the motor 1 in the orientation along which the center axis J1 is directed is reduced by comparison to implementations in which the electronic components are populated onto the side of the circuit board 52 opposite its busbar 51 side. This aspect therefore contributes to scaling down the motor 1.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

What is claimed is:

1. An electrically powered motor for assisting vehicular driving operations, the motor comprising:
    a stator section including a stator core including a plurality of stator teeth, the stator core having a first alignment feature;
    a sensor mounting member having a second alignment feature;
    a rotor section having a field magnet arranged to generate, between itself and said stator core, torque that centers on a predetermined center axis; and
    a bearing mechanism, centered on the center axis, arranged to rotatably support said rotor section with respect to said stator section; wherein
    said stator section includes a sensor arranged to detect a position of the field magnet, the sensor arranged in the sensor mounting member;
    said sensor mounting member is fixed indirectly to said stator core; and
    the first alignment feature is directly aligned with the second alignment feature such that the sensor is directly aligned with the stator core.

2. A motor as set forth in claim 1, wherein:
    the teeth are arranged radially converging on the center axis, with forward edges of the teeth being directed toward the center axis;
    the second alignment feature is provided in a rim surface of the sensor mounting member which is substantially parallel to the center axis; and
    the first alignment feature is provided on an inner circumferential surface of the stator core.

3. A motor as set forth in claim 2, wherein:
    the first alignment feature is one gap among a plurality of gaps, paralleling the center axis, between the forward edges of said plurality of teeth; and
    the second alignment feature is a groove.

4. A motor as set forth in claim 1, further comprising:
    a busbar member that includes a third alignment feature; wherein
    the third alignment feature is substantially coaxial with the first alignment feature and the second alignment feature; and
    a jig is simultaneously received within each of the first alignment feature, the second alignment feature, and the third alignment feature.

5. A motor as set forth in claim 4, wherein:
    the busbar member is positioned between the sensor mounting member and the stator core.

6. A motor as set forth in claim 4, wherein the sensor mounting member is arranged on the busbar member.

7. A motor as set forth in claim 6, wherein the busbar member includes a recess arranged to accommodate the sensor mounting member.

8. A motor as set forth in claim 7, wherein an outer circumferential dimension of the sensor mounting member is smaller than an inner circumferential dimension of the recess.

9. A motor as set forth in claim 4, wherein the sensor mounting member includes a surface projection arranged to be received within a recess in the busbar member.

10. A motor as set forth in claim 4, wherein the sensor mounting member includes an L-shaped surface projection arranged to be supported by an inner circumferential surface of a recess defined in an axial end of the busbar member.

11. A motor as set forth in claim 4, wherein the sensor mounting member is arranged to be sandwiched between a circuit board and the busbar member, which is adjacent to the circuit board.

12. An electrically powered motor for assisting vehicular driving operations, the motor comprising:
    a stator section including a stator core having a first alignment feature in which a jig seats, a sensor mounting member having a second alignment feature in which the jig seats, and a sensor fixed to the sensor mounting member;
    a rotor section having a field magnet arranged to generate, between itself and the stator core, torque that centers on a predetermined center axis;
    a bearing mechanism, centered on the center axis, arranged to rotatably support the rotor section with respect to the stator section; and
    a busbar member arranged between the sensor mounting member and the stator core; wherein
    the sensor is arranged to detect a position of the field magnet;
    the sensor mounting member is mounted to the busbar member;
    the busbar member is mounted to the stator core; and
    the first alignment feature is directly aligned with the second alignment feature when the jig is seated in the first alignment feature and the second alignment feature.

13. The motor as set forth in claim 3, wherein the groove is arranged at a circumferential surface of the sensor mounting member facing the center axis.

* * * * *